US009585059B2

(12) United States Patent
Persson et al.

(10) Patent No.: US 9,585,059 B2
(45) Date of Patent: Feb. 28, 2017

(54) CONFIGURED HEADER COMPRESSION COVERAGE

(71) Applicant: Telefonaktiebolaget L M Ericsson (publ), Stockholm (SE)

(72) Inventors: Fredrik Persson, Märstra (SE); Gertie Alsenmyr, Vallentuna (SE); Erik De Wit, Rimbo (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 104 days.

(21) Appl. No.: 14/527,607

(22) Filed: Oct. 29, 2014

(65) Prior Publication Data
US 2015/0117460 A1  Apr. 30, 2015

Related U.S. Application Data

(60) Provisional application No. 61/897,125, filed on Oct. 29, 2013.

(51) Int. Cl.
*H04L 12/28* (2006.01)
*H04W 28/06* (2009.01)
*H04L 29/06* (2006.01)
*H04L 12/811* (2013.01)

(52) U.S. Cl.
CPC .............. *H04W 28/06* (2013.01); *H04L 47/38* (2013.01); *H04L 69/04* (2013.01); *H04L 69/22* (2013.01)

(58) Field of Classification Search
CPC ........ H04W 28/06; H04L 69/04; H04L 47/38; H04L 69/22
See application file for complete search history.

(56) References Cited

U.S. PATENT DOCUMENTS

| | | | | |
|---|---|---|---|---|
| 6,750,942 B2 * | 6/2004 | Honda | ................... | G03B 21/50 352/92 |
| 8,427,347 B1 * | 4/2013 | Chai | ....................... | H03M 7/30 341/51 |
| 2007/0156928 A1 * | 7/2007 | Raghunandan | ....... | G06F 9/3851 709/251 |
| 2009/0073959 A1 * | 3/2009 | Xu | ......................... | H04L 65/607 370/352 |
| 2009/0219930 A1 * | 9/2009 | Dolganow | .............. | H04L 69/04 370/389 |
| 2010/0302997 A1 * | 12/2010 | Park | ...................... | H04L 45/742 370/315 |
| 2011/0019695 A1 * | 1/2011 | Wu | ........................ | H04W 28/06 370/477 |
| 2013/0142166 A1 * | 6/2013 | Bogineni | ................ | H04W 8/02 370/331 |
| 2013/0215907 A1 * | 8/2013 | Jonsson | ................... | H04L 69/22 370/474 |

(Continued)

*Primary Examiner* — Phuc Tran

(74) *Attorney, Agent, or Firm* — Patent Portfolio Builders, PLLC

(57) ABSTRACT

A method of configuring a header compression or decompression algorithm in a packet network. The method comprises the steps of analyzing or receiving packet information associated with packet traffic, and determining a representative header length to consider as the header length for a plurality of packets. The method further comprises using the representative packet header length to configure one or more compression or decompression algorithms used in the network.

23 Claims, 12 Drawing Sheets

(56) References Cited

U.S. PATENT DOCUMENTS

2014/0242975 A1* 8/2014 Suemitsu ............... H04B 1/40
                                                       455/422.1
2014/0310388 A1* 10/2014 Djukic ............... H04L 41/0816
                                                       709/221

* cited by examiner

IPv4 Header Format

| Offsets | Octet | 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|---|
| Octet | Bit | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 0 | 0 | Version | | | | IHL | | | | DSCP | | | | | | ECN | | Total Length | | | | | | | | | | | | | | | |
| 4 | 32 | Identification | | | | | | | | | | | | | | | | Flags | | | Fragment Offset | | | | | | | | | | | | |
| 8 | 64 | Time To Live | | | | | | | | Protocol | | | | | | | | Header Checksum | | | | | | | | | | | | | | | |
| 12 | 96 | Source IP Address | | | | | | | | | | | | | | | | | | | | | | | | | | | | | | | |
| 16 | 128 | Destination IP Address | | | | | | | | | | | | | | | | | | | | | | | | | | | | | | | |
| 20 | 160 | Options (if IHL > 5) | | | | | | | | | | | | | | | | | | | | | | | | | | | | | | | |

Fig. 1c

Fixed header format

| Offsets | Octet | Bit | 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|---|
| Octet | Bit | | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 0 | 0 | | Version | | | | Traffic Class | | | | | | | | Flow Label | | | | | | | | | | | | | | | | | | |
| 4 | 32 | | Payload Length | | | | | | | | | | | | | | | | Next Header | | | | | | | | Hop Limit | | | | | | | |
| 8 | 64 | | Source Address | | | | | | | | | | | | | | | | | | | | | | | | | | | | | | |
| 12 | 96 | | | | | | | | | | | | | | | | | | | | | | | | | | | | | | | | |
| 16 | 128 | | | | | | | | | | | | | | | | | | | | | | | | | | | | | | | | |
| 20 | 160 | | | | | | | | | | | | | | | | | | | | | | | | | | | | | | | | |
| 24 | 192 | | Destination Address | | | | | | | | | | | | | | | | | | | | | | | | | | | | | | |
| 28 | 224 | | | | | | | | | | | | | | | | | | | | | | | | | | | | | | | | |
| 32 | 256 | | | | | | | | | | | | | | | | | | | | | | | | | | | | | | | | |
| 36 | 288 | | | | | | | | | | | | | | | | | | | | | | | | | | | | | | | | |

Fig. 1d

TCP Header

| Offsets | Octet | 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|---|
| Octet | Bit | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 0 | 0 | Source port ||||||||||||||||  Destination port ||||||||||||||||
| 4 | 32 | Sequence number ||||||||||||||||||||||||||||||||
| 8 | 64 | Acknowledgment number (if ACK set) ||||||||||||||||||||||||||||||||
| 12 | 96 | Data offset |||| Reserved 0 0 0 ||| N S | C W R | E C E | U R G | A C K | P S H | R S T | S Y N | F I N | Window Size ||||||||||||||||
| 16 | 128 | Checksum |||||||||||||||| Urgent pointer (if URG set) ||||||||||||||||
| 20 | 160 | Options (if data offset > 5. Padded at the end with "0" bytes if necessary.) ||||||||||||||||||||||||||||||||
| ... | ... | ... ||||||||||||||||||||||||||||||||

Fig. 1e

CONFIGURED HEADER COMPRESSION COVERAGE

CROSS-REFERENCE TO RELATED APPLICATIONS

This application claims the benefit of U.S. Provisional Application No. 61/897,125, filed Oct. 29, 2013, which is hereby incorporated by reference.

FIELD

The present invention relates to methods and apparatus for estimating appropriate header lengths of packet traffic in a network to optimise the computational resources when compressing/decompressing packet headers of packet traffic in the network.

BACKGROUND

Data communications in packet switched (PS) networks includes the transmission of data over a network as a sequence of small data chunks or suitable sized data blocks called packets. Each packet is passed through the network from a source (e.g. a user equipment or other network entity) to a destination (e.g. another user equipment or another network entity) via one or more network entities or nodes. Each packet typically includes a data payload, which is a small chunk of the data being transmitted, and a packet header, which typically provides information such as the destination and/or source address and the type of packet or communications protocols being used. PS networks may comprise or represent a communication network that groups all transmitted data into suitable sized data blocks called packets. Examples of specific PS networks that may be used in certain embodiments of the described network include, but are not limited to, legacy PS networks such as the second generation (2G), 2.5 generation (2.5G), third generation (3G), and fourth generation and beyond (4G and beyond) type networks, and/or evolved packet switched (EPS) networks, and/or all internet protocol (IP) based PS networks.

For example, the so-called Universal Mobile Telephone System (UMTS) (a legacy PS network commonly known as a 3G radio communication system), which has evolved into using enhanced PS network technologies such as High Speed Packet Access (HSPA) technology. In addition, air interface technologies within the UMTS framework have begun to evolve towards new air interface technologies defined in the so-called Long Term Evolution (LTE) and LTE-Advanced systems.

The next generation radio communication systems and networks such as LTE and LTE-Advanced are considered to be all IP networks. These networks will have an upgraded PS network infrastructure called the evolved packet system (EPS). The EPS includes an evolved packet core (EPC) that forms the basis of the core PS network for the all IP network. These enhanced PS networks will provide all the mobile core functionality that, in the previous generations (2G, 2.5G, and 3G), has been realised through the existing CS networks and legacy PS networks.

The user equipment (UE) may comprise or represent any device used for communications. Examples of user equipment that may be used in certain embodiments of the described network are wireless devices such as mobile phones, terminals, smart phones, portable computing devices such as lap tops, handheld devices, tablets, netbooks, computers, personal digital assistants and other wireless communication devices, or wired communication devices such as telephones, computing devices such as desktop computers, set-top boxes, and other fixed communication devices.

A network element or entity may comprise or represent any network node, device, function, or entity for use in a telecommunications network which can be managed over a specific interface. Examples of network elements or entities that may be used in certain embodiments of the described network(s) are network elements, nodes, devices, functions, or entities that make up core network(s), access network(s) such as packet or circuit switched network(s), IP based networks, 2G, 3G, 4G and next generation networks, IMS core network, IMS service network, and service and external networks and the like.

Data communications has evolved to use many different communications protocols or standards (e.g. Internet Protocols, TCP/IP protocols, UDP protocols etc.) for use in transmitting data from a source to the destination. These communications protocols may be layered in a so-called protocol stack in which a layer of the protocol stack serves the layer above it and the layer below it.

Typically a protocol stack includes an application layer, a transport layer and a network layer. The application layer includes logic needed to support various user applications or application programs, the transport layer includes mechanisms to provide reliable communication of application data controlled by the application layer, and the network layer is concerned with exchange of data between the source and the destination or the physical devices in the network. Examples of protocol stacks include the TCP/IP protocol suite (providing application, transport, internet, network access, and physical layers) or the open systems interconnection (OSI) model (providing application, presentation, session, transport, network, data link, and physical layers).

FIG. 1a illustrates the structure of an example packet with IP and transport protocol headers in the packet header followed by the packet payload, which includes higher layer protocol information and the data or data chunk being transmitted. In order to provide reliable communications, data is passed between the layers in the form of packets, in which at each layer may insert additional data related to that layer to the payload of a packet and a header related to that layer. This means that packets may include one or more packet headers associated with the various communications protocols and/or layers of the protocol stack that may be used when communicating the data from the source to the destination. The headers depend on where in the network or at what level/layer (e.g. application layer, transport layer, or network layer) of the communication protocol or system the packet data is situated.

Since most of the packet header information is either static or are updated according to predictable patterns, the packet headers can be compressed to increase transmission efficiency. Conventionally, packet headers in packet traffic transmitted over a network are compressed by analysing the header(s) of each packet to determine the number of bits that are to be compressed. For example, when applying packet header compression, the packet header is analyzed in detail, and specific packet header fields are divided into static, semi-dynamic and dynamic fields. In this case the packet header shall be treated as a bit stream without making specific considerations about the header, except for limiting the compression range to cover the bits of the header.

FIGS. 1b-1d illustrates various protocol header formats that may be used. FIG. 1b illustrates the protocol header format for the User Datagram Protocol (UDP) protocol, FIG.

1c illustrates an Internet Protocol version 4 (IPv4) header format for the IPv4 protocol, FIG. 1d illustrates an Internet Protocol version 6 (IPv6) header format for the IPv6 protocol, and FIG. 1e illustrates a Transmission Control Protocol (TCP) header format for TCP. The sizes of the headers for the different IP level protocols are shown in Table 1.

TABLE 1

Example IP level protocol headers and sizes.

| Protocol header (size) [bytes] | Optional fields, size [bytes] |
|---|---|
| IPv4 (20) | Options (20-60) |
| IPv6 (40) | Extension headers |
| UDP (8) | |
| TCP (20) | Options (0-40) |

It is apparent that each protocol uses a different header format that has a different size. In the header, the IP version is visible in the "version" field in the IP header, and the underlying transport protocol is also given in the IP header. IP packet inspection (PI) is normally sufficient to identify which protocols are being used over a specific connection.

Packet Inspection may comprise or represent the analysis of packets at different levels, from IP header classification to the deep packet inspection (DPI). The following describes some of the different levels of packet inspection and analysis that may be performed; these include, but are not limited to, IP header classification, shallow inspection, DPI, and heuristic detection.

IP header classification (a.k.a. 5-tuple inspection) is used to inspect packets up to the Internet layer, the so-called 5-tuple (Source IP address, Source IP port, Destination IP address, Destination IP port, Protocol (which runs on Transport layer, e.g. TCP, User Datagram Protocol (UDP), etc.) IP header classification is useful for identifying traffic targeting a specific port number, or a specific protocol. It is also useful when traffic from certain traffic domains, e.g. the Internet or Virtual Private Networks (VPNs), shall be treated in a specific way. For example, giving all Internet traffic a certain quality of service treatment (e.g., priority) or adding a different security protocol to a VPN.

Shallow inspection (a.k.a. Stateful inspection) is an analysis of the Transport Level protocol state, by inspecting the current protocol header (TCP, UDP etc.). For example, analysing the sequence of TCP header flags like SYN, ACK and FIN tells the state of the connection, and the receiver window size. Shallow inspection is useful when link layer algorithms are triggered by sequences of events of higher layer protocol interactions, without the need of knowing what content is carried. One example of use is to decrease the user terminal battery consumption by letting lower layer protocol states follow higher layer protocol layers. Shallow inspection also includes the analysis of all the fields of the IP header.

Deep packet inspection (DPI) is an analysis of data content on the Application Layer, e.g. hypertext transfer protocol (HTTP) state, video frame content etc. One common example where DPI is used is caching, where the HTTP request is analysed to identify which content to fetch from the cache. Link layer algorithms can also be made to adapt to specific types of content or applications.

Heuristic detection includes pattern detection or statistical identification methods on Application Layer data. Typically needed for classification of services with encrypted content, or for applications that intentionally tries to avoid identification (e.g., to avoid blocked of free voice of IP applications).

Conventionally, due to the large variation of possible packet headers in packet traffic transmitted over a network, PI needs to be performed on each packet when applying packet header compression, as the packet header is analyzed in detail, and specific packet header fields are divided into static, semi-dynamic and dynamic fields. PI may be used to determine the length of the packet header such that the header may be compressed using packet compression algorithms prior to transmission. The header length may represent the number of bits or bytes of the packet header, which may include one or more headers from the different communications protocols used in transmitting the packet.

For example, a file compression method, or compression methods working on bit streams, like GZIP or similar (which is LZ77 lossless compression combined with Huffman entropy coding), may be applied on specific parts of a bit stream, e.g. the packet headers only. Alternatively, a network operator or session or application may apply compression to IP packet headers only, that is, it is desired to compress the headers without further parsing of the IP packets. This means PI may need to be performed on each packet to determine the number of bits in the packet header that are to be compressed.

Given the sheer number of packets being transmitted in a network, performing PI such as IP header classification, shallow inspection, DPI, and/or heuristic detection for each packet in order to determine the header length of the header to be compressed is becoming infeasible. This is due to the large amount of packet traffic, the computational resources required for PI on each packet due to insufficient hardware or software (e.g. UEs), and/or the delays incurred for performing PI on each packet. Therefore, there is a significant need to optimise the compression and decompression of packet headers for packet traffic in the network while minimising the computational resources and delays in transmitting packets in the network.

Whilst performing packet inspection (PI) on each and every packet in the network may determine the header length of each packet, it is rather computationally intensive and can incur significant delay.

SUMMARY

It is an object of the present invention to provide methods and apparatus for estimating the header length of packets to be transmitted and/or packet traffic in a network to minimise the computational resources and delays of performing PI on each and every packet, thereby optimising network performance. Aspects of the present invention provide methods and apparatus used by UEs and/or one or more network entities in a network for efficiently determining the header length of packet traffic and using the header length in compressing/decompressing packet headers.

According to a first aspect of the present invention there is provided a method of configuring a header compression or decompression algorithm in a packet network. The method comprises the steps of analysing or receiving packet information associated with packet traffic, and determining a representative header length to consider as the header length for a plurality of packets. The method further comprises using the representative header length to configure one or more compression or decompression algorithms used in the network.

The process of determining the representative header length may comprise estimating a header length or measuring a header length. Preferably the plurality of packets comprise subsequent packets for transmission or an entire bit stream.

Preferably, the method further comprises the step of compressing or decompressing a section of each of the plurality of packets; wherein a length of the section is determined by the representative header length.

Optionally, determining the representative header comprises determining what is the most efficient header length to consider as the header length for the plurality of packets.

Preferably, the header length can include one or more protocol headers (e.g. at least one or several protocol headers).

The determined header length is used to configure one or more compression/decompression units or algorithms used in the network (e.g. in UEs or in network entities responsible for compression and/or decompression of packets) for compressing/decompressing the packet headers of packet traffic being transmitted.

Determining the representative header length may include estimating the header length based on the analysis or based on receiving the packet information associated with packet traffic in the network. The estimated header length may need to change or be updated from time-to-time because the type of packet traffic may change. The header length may also change between use cases such as applications used per communication session or between markets in which one or more network entities or one or more UEs operate.

As an option, the estimation of the header length may be performed periodically, or at predetermined time intervals. The estimation of the header length may be triggered by various events such as the beginning or end of a communication session between UEs or network entities. Optionally, the step of estimating the header length may be triggered again when the current estimated header length is unsuitable for the present bit stream or packets. For example, estimating or recalculating the estimated header length may be triggered when it is detected that the estimated header length results in sub-optimal packet header compression. Additionally or alternatively, a further header length is recalculated/determined based on receiving further packet information associated with further packet traffic, and/or analysing further packet traffic, the further header length is compared with the current estimation of header length sent to the compressor/decompressor. If the difference between the further header length and the current estimation of header length sent to the compressor/decompressor is greater than a threshold, or predetermined threshold, or set value, then the further header length estimate is sent to the compressor/decompressor to replace the current header length estimate.

In other aspects of the invention, data or packet traffic may be analysed from which an appropriate figure or value of header length or size is determined (e.g. covering IP networking layer and transport layer protocols). The determined header length is used to pre-configure packet compression and/or decompression algorithms used in performing packet header compression. The analysis and/or determination of the header length can be made either in the network or in the mobile terminal. The analysis and/or determination of the header length may be performed in at least one or one or more network entities, nodes, or elements of the network or one or more UEs. For example, the one or more network entities, nodes or elements of the network may be associated with the network entities, nodes or elements that are responsible for packet compression and/or packet decompression. Alternatively or additionally, the one or more network entities, nodes or elements may be associated with systems responsible for data analytics of packet traffic.

Analysing and/or determining the header length for pre-configuring the compression/decompression algorithms may be based on IP header information retrieved by IP header inspection of current and past traffic, where it is possible to look into packet headers and find IP version and transport control protocol. Additionally or alternatively, analysing and/or determining the header length may be based on statistics from different markets or different mobile terminal types, to find out how often certain transport protocols or certain IP or TCP options are typically used, or other regional differences.

An aspect of the invention may provide a method for operating an apparatus (e.g. a header length estimator) in a network or a UE including the steps of receiving packet information associated with packet traffic, the packet information including data representative of packet header information, determining an estimate of the header length of relevant packet traffic based on the received packet information, wherein the relevant packet traffic is associated with the packets that are to be compressed/decompressed by one or more packet compressors/decompressors, sending the estimated header length to the one or more packet compressors (or one or more packet compressors in the network) for use in compressing the packet headers of packets, sending the estimated header length to one or more packet decompressors (or one or more packet decompressors in the network) for use in decompressing the corresponding packet headers of the corresponding packets that were compressed by the one or more packet compressors.

Optionally, packet traffic can be analysed in both uplink and downlink directions, but since traffic is normally bi-directional regarding the actual protocols, it is in most cases sufficient to analyze the downlink traffic. The pre-configured header length or size can be defined per user/UE (e.g. using the International Mobile Subscriber Identity (IMSI)), UE type (e.g. using the International Mobile Equipment Identity (IMEI)) or network (e.g. if automated detection is required, for example the Public Land Mobile Network Identifier (PLMN-ID) can be used), which provides several different levels of granularity.

According to a further aspect of the present invention there is provided apparatus for compression or decompression of packet headers in a communications network. The apparatus comprises a length estimator module configured to provide a representative header length, and a compression or decompression module configured using the determined header length.

According to a still further aspect of the present invention there is provided a system comprising at least one apparatus according to the previous aspect of the invention, at least one operations and management network element and at least one additional compressor or decompressor. The operations and management network element is configured to receive header length estimates from the or each apparatus and to transmit at intervals appropriate header estimates to each of the at least one additional compressor and/or the at least one decompressor.

The present invention provides the advantage of simplifying the implementation of data compression methods/algorithms that will compress packet headers (e.g. IP level headers) without analysing the actual headers to be compressed, by instead estimating a length of the packet sequence that fits the majority of actual packet headers as well as possible while considering that packet flows (e.g. sequences of one or more packets) include a mix of several protocols. Other advantages include a more processing efficient implementation of packet header compression without decreasing the compression gain.

BRIEF DESCRIPTION OF THE DRAWINGS

FIG. 1c is a schematic illustration of a typical IPv4 packet header format;

FIG. 1d is a schematic illustration of a typical IPv6 packet header format;

FIG. 1e is a schematic illustration of a typical TCP packet header format;

DETAILED DESCRIPTION

Figure 1A:
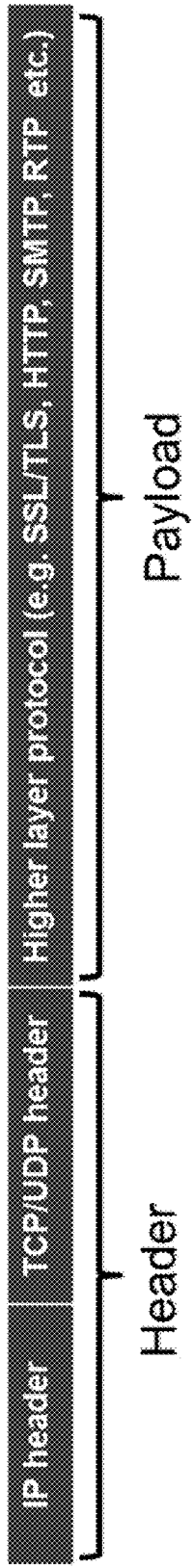
FIG. 1a is a schematic illustration of a typical packet with a packet header and packet payload.
Figure 1B:
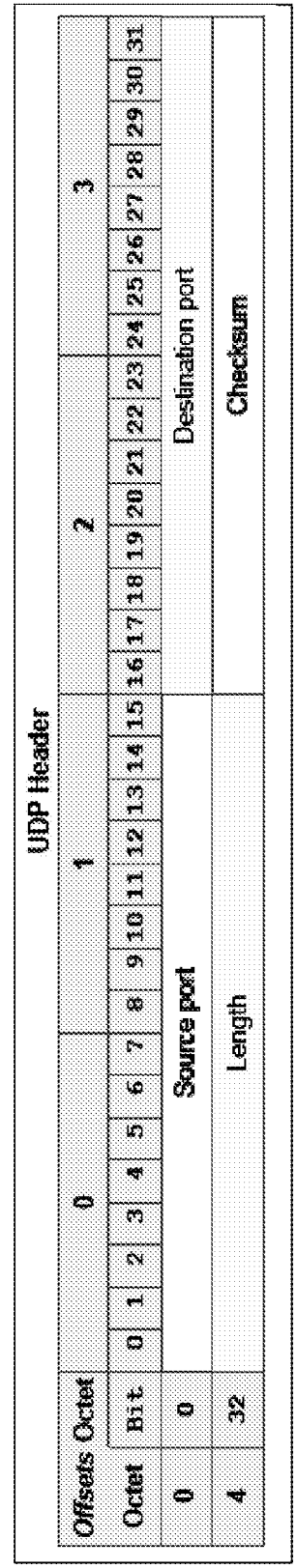
FIG. 1b is a schematic illustration of a typical UDP packet header format.

The following description sets forth specific details, such as particular embodiments for purposes of explanation and not limitation. But it will be appreciated by one skilled in the art that other embodiments may be employed apart from these specific details. In some instances, detailed descriptions of well known methods, interfaces, circuits, and devices are omitted so as not obscure the description with unnecessary detail. Individual blocks are shown in the figures corresponding to various nodes. Those skilled in the art will appreciate that the functions of those blocks may be implemented using individual hardware circuits, using software programs and data in conjunction with a suitably programmed digital microprocessor or general purpose computer, and/or using applications specific integrated circuitry (ASIC), and/or using one or more digital signal processors (DSPs). Nodes that communicate using the air interface also have suitable radio communications circuitry. The software program instructions and data may be stored on computer-readable storage medium, and when the instructions are executed by a computer or other suitable processor control, the computer or processor performs the functions.

Thus, for example, it will be appreciated by those skilled in the art that diagrams herein can represent conceptual views of illustrative circuitry or other functional units. Similarly, it will be appreciated that any flow charts, state transition diagrams, pseudo code, and the like represent various processes which may be substantially represented in computer readable medium and so executed by a computer or processor, whether or not such computer or processor is explicitly shown.

The functions of the various illustrated elements may be provided through the use of hardware such as circuit hardware and/or hardware capable of executing software in the form of coded instructions stored on computer-readable medium. Thus, such functions and illustrated functional blocks are to be understood as being either hardware-implemented and/or computer-implemented, and thus machine-implemented. In terms of hardware implementation, the functional blocks may include or encompass, without limitation, DSP hardware, reduced instruction set processor, hardware (e.g., digital or analog) circuitry including but not limited to ASIC(s) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

As discussed above, present approaches for analysing and determining header lengths and using the determined header length for packet compression/decompression can be computationally resource intensive and/or generate delays due to processing all packets being transmitted from a source to a destination device or network entity. In addition, present approaches for performing packet inspection (PI) are complex and can be slow to implement. Monitoring large amounts of network traffic in this way is complex and requires a great deal of processing power to be carried out, often at great expense to the user equipment (UE) and/or network element or entity responsible for performing packet compression/decompression such as packet header compression/decompression.

It is proposed herein that these problems can be addressed by a method and apparatus that can analyse packet traffic and/or receive packet information associated with packet traffic and determine (or estimate) a representative header length of appropriate length or size based on the packet information that may be used to configure a packet compression algorithm and decompression algorithm when compressing the packet header of subsequent packets. The method or apparatus determining the appropriate header length can be performed either by a network entity or element in the network or by a UE or mobile terminal. The packet compression algorithm(s) for compressing the packet header(s) may be located in the UE and/or a network entity (or one or more network entities) in the network.

Packet traffic can be analysed in both uplink and downlink directions. The analysis of packet traffic or a portion of the packet traffic that is relevant to the network entity or UE, which may require the determined header length, may be performed within the network entity or UE, respectively.

Alternatively, the analysis may be performed in another network entity responsible for data analytics of packet traffic within the network, where the other network entity sends results in the form of packet information to the network entity or UE for determining an estimate of the appropriate header length.

It may be sufficient to analyse packet traffic in only one direction, for example the downlink direction as packet traffic is typically bi-directional regarding the actual communication protocols used. Alternatively or additionally, the bulk of the analysis of packet traffic may be performed elsewhere in the network, for example, in a dedicated packet traffic analysis unit or data analytics unit, such that packet information associated with the packet traffic is sent to the network entity or UE for use in the determination of the appropriate header length for use by the network entity or the UE in compressing/decompressing packet headers of subsequent packets. The packet information may include data representative of the common IP headers used in the downlink for a particular communication session or common communication sessions, market statistics, etc.

The determination of the appropriate header length may be based on IP header information retrieved by IP header inspection of current and past traffic or portions of current and past packet traffic relevant to the network entity or UE. This allows the most common IP headers to be determined based on the packet header information e.g. IP version and transport control protocol, from this an estimate of the packet header length may be determined using knowledge of the typical header format of the most common IP header. Additionally or alternatively, statistics of packet traffic from different markets (or network operators) or UE/mobile terminal types, to find how often certain transport protocols or certain IP or TCP options are typically used, or other regional differences.

One illustrative example using IP header inspection is to first identify the IP version. If the first four bits of the IP header (the Version field) contains the binary code representing IPv4, this means the IP header is according to FIG. 1c. Consequently, the next four bits of the IP header contains the Internet Header Length (IHL), which gives the total length of the IP header. The Protocol field will reveal the transport level protocol. If the binary code represents TCP, the next header will be a TCP header according to FIG. 1e. Finally the binary code in the Data offset field represents the total size of the TCP packet, including possible options. The total header length of a particular packet is the sum of the stated header lengths. Since a UE or mobile terminal normally communicates over a number of sessions and connections, the header lengths will differ both between packets and over time. Especially TCP Options, if used, may vary both in size and over time. By inspecting a number of packets one can estimate an appropriate length representing the subsequent sequences of packets, for example the largest length of packet headers found, the average length over all packets, or the average length over all packets excluding some rare packet sizes found.

Another example, considering market information, is to identify if IPv6 is being widely deployed, if UDP traffic is very common and if TCP options like TCP timestamp are being used, for example to enable specific functionality in the network. It is also possible that TCP options are being used for proprietary purposes within a network.

The determined header length may be used as a pre-configured header length or size that is defined per user/UE (e.g. IMSI), UE type (e.g. IMEI) or network (e.g. PLMN-ID), to mention some levels of granularity for use in packet compression/decompression. The determined header length may be updated should the estimated header length be detected to be an underestimate or an overestimate for the bulk of the packet traffic relevant to the network entity or the UE that is compressed.

Figure 2:
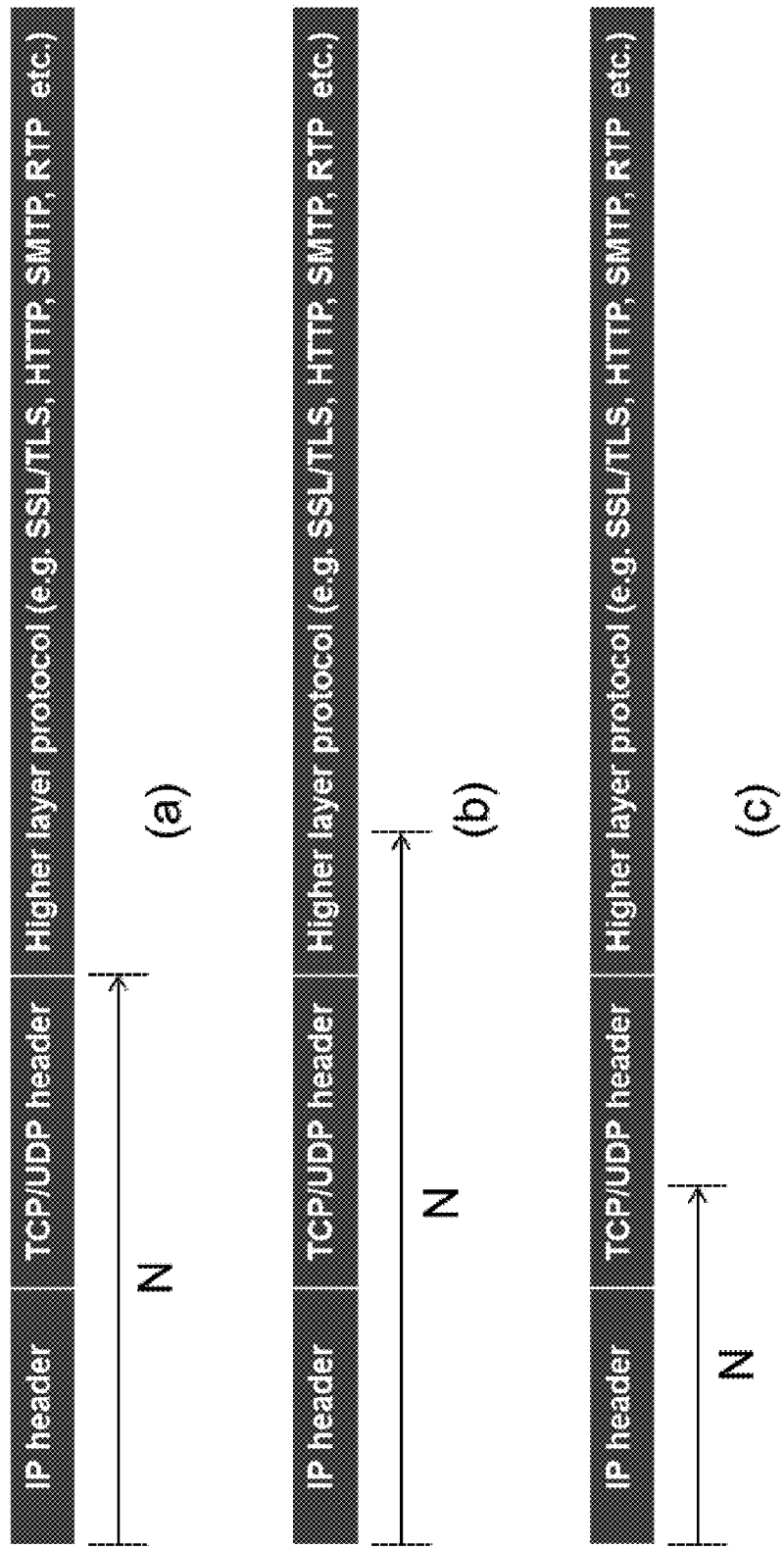
FIGS. 2(a), (b) and (c) is a schematic illustration of using an estimated header length according to the invention.

FIGS. 2(a), (b) and (c) illustrates using a representative header length for compressing the packet header of the example packet illustrated in FIG. 1a. The methods and apparatus for estimating the header length as described herein may be used to determine a value for the representative header length or size. The examples illustrated in FIGS. 2(a), 2(b) and 2(c) assume that the representative header length is an estimated length of N bytes.

This estimated header length is used to configure the compression, so that it compresses a section equal in length to the representative header length. In FIG. 1a, the example packet includes IP and transport protocol headers followed by its payload consisting of higher layer protocol information. Once the header length is determined from the relevant packet information associated with the relevant packet traffic, the estimated header length (e.g. N bytes) is used to configure a packet compressor or compression algorithm. On receipt of the estimated header length (e.g. N bytes) the packet compressor compresses N bytes of the packet header, which may include one or more packet header(s) from the various communication protocols (e.g. IP and transport protocol headers), starting from the beginning of the packet header, where N is the estimated length of the headers in bytes. Although the estimated header length, N, is described in bytes, it is to be appreciated by the person skilled in the art that the header length N may be described in bits or any other appropriate unit describing the length of a packet header.

In the ideal case N will match the actual target packet header as shown in FIG. 2(a). The compression algorithm is pre-configured to use the estimated header length, N, for subsequent packets and the packet header compression should be ideal for most packets that are subsequently transmitted. FIG. 2(b) illustrates when the estimated header length or size, N, is overestimated and FIG. 2(c) illustrates when it is underestimated. In case of under/overestimation, the compressor will cover less/more than what should be covered ideally. Since the estimated header length, N, is determined to be suitable for the bulk of the packet traffic relevant to the network entity or the UE, then most of the packet headers will have their headers optimally compressed as shown in FIG. 2(a). In case the total length of the packet is less than N, the entire packet is compressed, i.e., less than N bits/bytes are compressed. This results in efficient header compression reducing the requirements of performing PI for each packet that is to be transmitted.

Over time it might be expected that the accuracy of the estimated header length that is used to pre-configure the compressor deteriorates. Should it be detected that the estimated header length of the packet headers of the bulk of the packet traffic relevant to the network entity or the UE is an underestimate or an overestimate, or a combination thereof, and then this may trigger a new estimate or an update of the header length to be determined or generated. The updated header length N can then be used to re-configure the appropriate packet compressor/decompressor.

Figure 3A:
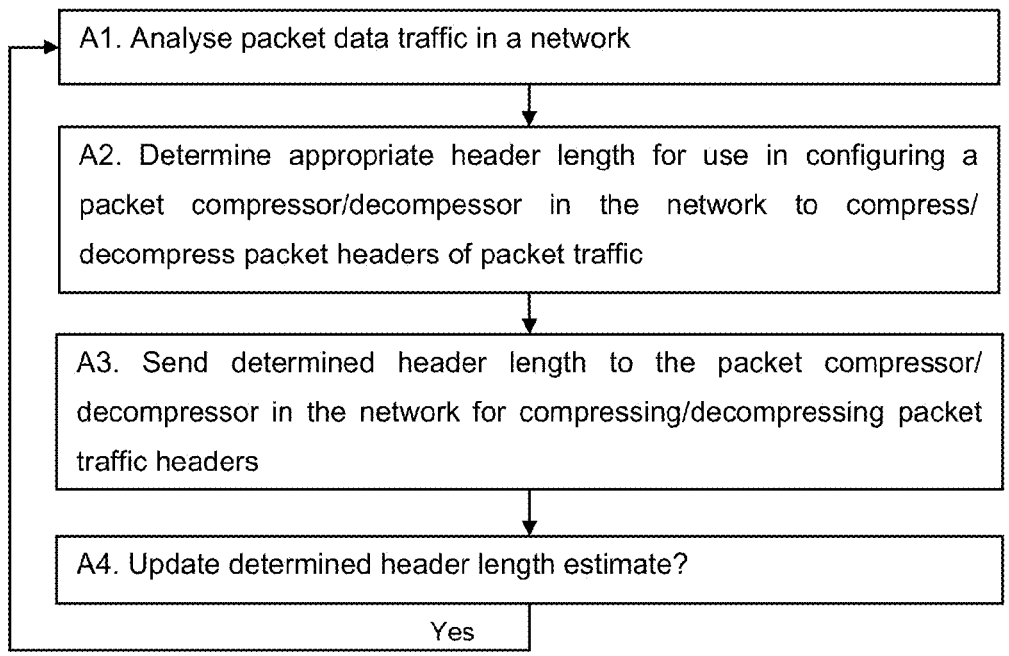
FIG. 3a is a flow diagram illustrating an example procedure carried out by an apparatus or method for analysing and estimating the header length.

FIG. 3a is a flow diagram illustrating an example for analysing and determining an appropriate header length for use in configuring a packet compressor/decompressor in a network. In FIG. 3a, the method is based on the following steps:

A1. Analyse packet data traffic in the network.
A2. Determine appropriate header length for use in configuring a packet compressor/decompressor in the network to compress/decompress packet headers of packet traffic.
A3. Send the determined header length to the packet compressor and/or decompressor in the network for compressing and/or decompressing packet headers.
A4. Update the determined header length estimate? This may be performed periodically, from time-to-time, or it may be been detected that the determined header estimate requires updating as it has become suboptimal and predominately under-estimates and/or over estimates the headers of subsequent packets. If the determined header length estimate requires updating (e.g. yes) then proceed to step A1.

In step A3, the determined header length may optionally be sent to the packet compressor/decompressor in the network or in a UE by out of band signalling, control signalling, other interfaces, or using compression header fields or compression header field extensions in the compressed packets that the compressor may insert such that the decompressor may retrieve the header length estimate for use in decompressing compressed packets that have been compressed using the estimated header length. Optionally, the estimated header length may be sent to the compressor for compressing headers of subsequent packets, and the compressor may further send the estimated header length that is used during compression of the packet header to the corresponding decompressor(s) that will decompress the corresponding compressed packets.

In step A4, further analysis of packet traffic may be performed to discover/detect that the header length estimate should be updated. A further estimate of the header length may be calculated/generated from time-to-time based on further analysis of packet data traffic in the network. A decision is made to update the header length estimate sent to the compressor and/or decompressor when the further header length estimate deviates by a predetermined threshold or set value of the current header length estimate being used to compress/decompress the packets. This decision may prompt the method to perform steps A1-A3 again to recalculate the header length estimate, or to perform step A3 by sending the further header length estimate.

For example, if the difference between the further header length estimate and the current header length estimate is sufficiently large to motivate an update, then the further header length estimate is sent as in step A3 to the compressor/decompressor, or the header length estimate is recalculated, i.e. the method proceeds to step A1 to recalculate the header length estimate. The method may also receive further packet information or perform another analysis based on the relevant packet traffic for use in calculating or estimating the new or further estimates of the header length.

Figure 3B:
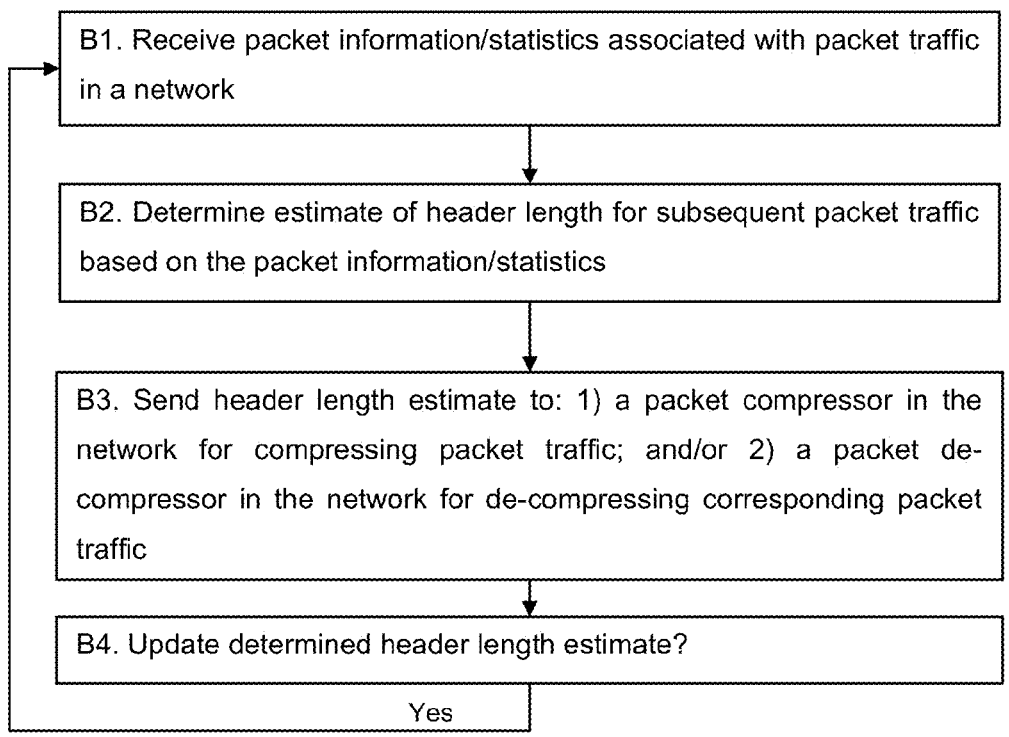
FIG. 3b is a flow diagram illustrating another example procedure carried out by an apparatus or method for estimating the header length.

FIG. 3b is another flow diagram illustrating an example method according to the invention for use by an apparatus (e.g. a header length estimator) in determining an appropriate header length based on received packet information, the header length for use in preconfiguring a packet compressor/decompressor in a network. In FIG. 3b, the method based on the following steps:
B1. Receive packet information/statistics associated with packet traffic in a network
B2. Determine estimate of header length for subsequent packet traffic based on the packet information/statistics
B3. Send header length estimate to: 1) a packet compressor in the network for compressing packet traffic; and/or 2) a packet de-compressor in the network for de-compressing corresponding packet traffic
B4. Update determined header length estimate? If yes, then proceed to B1.

In step B3, the determined header length may optionally be sent to the packet compressor(s)/decompressor(s) in the network or in a UE by out of band signalling, control signalling, other interfaces, or using compression header fields or compression header field extensions in the compressed packets that the compressor may insert such that the decompressor may retrieve the header length estimate for use in decompressing compressed packets that have been compressed using the estimated header length. Optionally, the estimated header length may be sent to the compressor for compressing headers of subsequent packets, and the compressor may further send the estimated header length that is used during compression of the packet header to the corresponding decompressor(s) that will decompress the corresponding compressed packets.

In step B4, further analysis of packet traffic may be performed, or further packet information may be received to assist in discovering/detecting that the header length estimate should be updated. The further packet information may be received periodically, or when a change in the patent information or event takes place (e.g. a new communication session occurs). Based on the further analysis or further packet information, a further estimate of the header length may be calculated/generated from time-to-time. A decision is made to update the header length estimate sent to the compressor and/or decompressor when the further header length estimate deviates by a threshold, predetermined threshold, or set value of the current header length estimate being used to compress/decompress the packets. The decision in step B4 may prompt the method to perform steps B1-B3 again to recalculate the header length estimate and send the updated header length estimate to the compressor/decompressor, or to perform step B3 by sending the further header length estimate.

For example, if the difference between the further header length estimate and the current header length estimate is sufficiently large to motivate an update, then the further header length estimate is sent as in step B3 to the compressor/decompressor, or the header length estimate is recalculated, i.e. the method proceeds to step B1 and/or B2 to recalculate the header length estimate. The method may also receive further packet information based on the relevant packet traffic to the apparatus for use in calculating or estimating the new or further estimates of the header length.

As has been briefly described, the appropriate header length to configure is estimated in either a UE or in the network by one or more network entities, but not necessarily, at the same location that is responsible for the packet compression/decompression algorithm. When doing packet header compression, the packet compressor or packet compression algorithm normally parses the packet to register what kind of protocol headers are present, which version, possible options, etc. Thereafter, specific fields are picked out and treated according to its characteristics and information content. However, according to the invention, an appropriate header length is determined/estimated and used to configure the packet compressor, the packet compressor treats each packet header as a byte string of a specific length based on the header length estimate, and instead of using PI to parse each and every packet header to find out the exact length, the estimate of the header length is used by the packet compressor to compress the packet header. The packet decompressor is also configured with the estimate of the header length to allow it to efficiently decompress the compressed packets. The estimate of the header length represents the header fields to be compressed and can be fixed for certain time period, and possibly change first at the start of the following time period.

A number of embodiments of apparatus according to the invention will now be described. It will be appreciated by the person skilled in the art that references to header length estimator refer to modules configured to provide a representative header length according to the invention and they are not restricted to any one way of determining the representative header length.

Figure 4A:
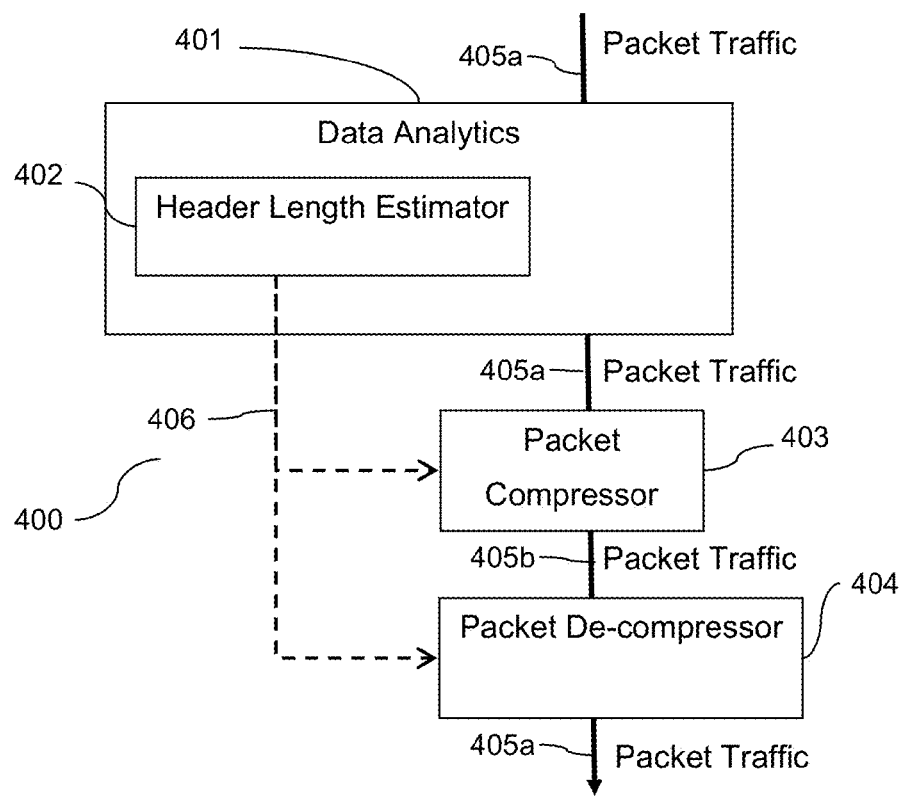
FIG. 4a is a schematic illustration of an example system for performing header length estimation.

FIG. 4a is a schematic illustration of an example system 400 for use in analysing and determining an appropriate header length for use in packet header compression/decompression in a network. The network may include one or more network entities (not shown) and one or more UEs (not shown) that generate packet traffic 405a. The system 400 includes a data analytics apparatus 401 that performs data analytics on packet traffic 405a, the packet traffic 405a includes packet headers that are uncompressed, however, the packet payloads may be compressed and/or encrypted. The data analytics apparatus 401 may perform packet inspection of the packet traffic 405a or receive packet information associated with the packet traffic and packet inspection from another network entity. The packet information may include data representative of the packet header information associated with an analysis of the packet traffic (e.g. statistics on the common packet headers, or information on the packet headers of the associated packet traffic, the types of communication protocols used or associated with packets in the packet traffic, etc.)

In this example, the data analytics apparatus 401 includes a header length estimator 402, which is provided with the packet information for use in determining an estimate of the header length of a relevant portion of the packet traffic 405a. The relevant portion of the packet traffic 405a includes the packets or packet traffic that is to be compressed by a packet compressor 403. The header length estimator 402 is in communication or is coupled to the packet compressor 403 and/or a packet decompressor 404. The packet compressor 403 may be located in a network entity (not shown) of the network responsible for packet compression, alternatively, the packet compressor may be located in a UE (not shown). The header length estimator 402 sends the header length estimate (illustrated by the dashed line 406) to the packet compressor 403 for use in compressing the packet headers of the relevant packet traffic 405a, to produce compressed packet traffic 405b. The header length estimator 402 may also send the header length estimate (illustrated by the dashed line 406) to the packet decompressor 404 for use decompressing the compressed packet headers of the corresponding compressed packets 405b, to produce the uncompressed packet traffic 405a. The packet compressor 403 and/or packet decompressor 404 are thus configured by the header length estimator 402 to use the header length estimate for compressing and decompressing the packet headers of the relevant packet traffic.

Additionally or alternatively, the estimated header length may optionally be sent to the packet compressor(s)/decompressor(s) 403/404 in the network or in a UE by out of band signalling, control signalling, other interfaces, or using compression header fields or compression header field extensions in the compressed packets that the compressor 403 may insert such that the corresponding decompressor 404 elsewhere in the network may retrieve the header length estimate for use in decompressing compressed packets that have been compressed using the estimated header length. Optionally, the estimated header length may be sent to the compressor 403 for compressing headers of subsequent packets, and the compressor 403 may further send the estimated header length that is used during compression of the packet header to the corresponding decompressor(s) 404 that will decompress the corresponding compressed packets.

Although the header length estimator 402 is illustrated as being part of data analytics apparatus 401, it is to be appreciated that the length estimator 402 may be located in or part of another network entity or even in a UE, with the data analytics apparatus 401 performing packet inspection or market analysis on the packet traffic being located in another part of the network (e.g. another dedicated data analytics network entity). The entity doing packet compression may be referred to as the Compressor (e.g. packet compressor 403), the entity doing packet decompression may be referred to as the De-Compressor (e.g. packet decompressor 404), and the entity making the estimate of the appropriate header length or size may be referred to as the Length Estimator (e.g. header length estimator 402). These entities may be located in the network in one or more network entities or elements and/or in one or more UEs.

The header length estimator 402 may operate at different levels of granularity depending on the resources available to the header length estimator 402. For example, at the lowest level of granularity, the header length estimator 402 or Length Estimator may consider packet information from the data analytics apparatus 401 based on each individual packet, and provide a header length estimate for each packet to the compressor 403 and decompressor 404. However, this level of granularity consumes both a lot of signaling resources towards the compressor 403 and hardware resources in the compressor itself. The advantage is that it will provide the most optimal header length estimates.

At another level of granularity, the header length estimator 402 may consider all packet data traffic per UE (e.g. based on IMSI) or per connection/session, and analyse which packet headers are included and measure the packet headers to determine the minimum, maximum and/or average total header lengths, which may be used as header length estimates. The estimate will be of more instantaneous nature and consider the best choice individually for each UE/connection/session (for the traffic to/from the particular UE at a particular time instant).

At another higher level of granularity, the header length estimate 402 may also analyse headers of traffic on certain port numbers or from certain IP addresses (e.g., to/from certain servers/proxies), and base its estimate only for a fraction of all traffic. This case can be useful if it is known that some particular traffic is more useful to compress for reasons such as hardware resource consumption or other business related opportunities (compression only for certain content provider's traffic, or similar).

At yet another higher level of granularity, the header length estimator 402 may instead base its decisions on statistics collected at a regional (or market) level, or for different UE/mobile terminal types or manufactures, or chipset vendors, to find how often certain transport protocols or certain IP or TCP options are typically used, or other regional/terminal related differences. Such an estimate fits very well a case where e.g. the operations and maintenance (O&M) system configures the length to compress per market, as an average fitting typical traffic in that region/market (e.g. based on PLMN-ID), or for a certain UE type (e.g. based on IMEI).

The header length estimator 402 may operate on different information elements. For example, the header length estimator 402 can receive packet information that considers the 5-tuple (source/destination ports and addresses, and transport protocol), or look at the packet information in the IP headers or transport protocol headers about protocol versions, supported options, etc. It can also go deeper to consider information about the application layer, e.g., to pinpoint the application traffic that benefits the most of a certain length to be compressed (finding e.g., the relevance of a certain maximum value, i.e., to know how to weight the different measured sizes in a weighted average).

In addition, the header length estimator 402 may operate on different time intervals for use in updating the header length estimate that is used to pre-configure the compressor 403 and/or decompressor 404. For example, the header length estimator 402 may calculate the optimal header length estimate when it is triggered by certain events, like a packet coming in, a particular connection or communication session being set up, when the UE attaches to the network, or similar events, or measured for an entire market once or a number of times per year or so.

The header length estimator 402 can have a packet inspection capability of its own, or receive the needed packet header information from another network entity with such capabilities. For example, from national statistics, the latter case is probably the most typical. The header length estimator 402 may then update the header length estimate based on receipt of new packet header information from the other network entity, which may send this out periodically or when the packet header information significantly changes such that the header length estimate should be updated.

The header length estimate is sent from the header length estimator 402 to the compressor 403, which then uses the header length estimate to define how many bytes (or bits) from the beginning of a packet that shall be compressed, and for all the following packets until a new header estimate is received from the header length estimator 402. The header length estimate is also sent to the de-compressor 404, because the decompressor 404 will need to know how many bytes of the header have been compressed for corresponding compressed packets.

The header length estimate may be sent from the header length estimator 402 to another network entity (not shown) that performs network operations and management (e.g. an Operations and management network element). For example, the network may have multiple header length estimators 402 in the network and the O&M network element may receive header length estimates from these various header length estimators 402. The O&M network element then sends the appropriate header length estimate at predetermined time intervals or when the corresponding header length estimate is updated to each corresponding compressor 403 and/or decompressor 404 in the network. Thus the compressor/decompressor 403/404 may be configured by the O&M network element with the header length estimate.

Typically the header length estimate and the packet information measured by the data analytics apparatus 401 or the header length estimator 402 are based on uncompressed packet traffic 405a and/or packet traffic 405a with uncompressed headers. One way to achieve this is to perform the data analytics or measurements on downlink packet traffic in case of uplink compression, and vice versa. Most IP and transport protocol header information is symmetric when it comes to the size of the associated packet headers.

Sometimes, this symmetry may not be able to be used such that measurements cannot be performed in the opposite direction. Instead the packet traffic measurement (or probing of packet traffic 405a) could be located before the compressor 403 as shown in FIG. 4a, or after the decompressor 404 as shown in FIG. 4c.

If compression lengths are estimated in real-time on a per packet level, the packet traffic measurements should preferably be located before the compressor 403 so that uncompressed packet traffic 405a is probed/analysed. Of course, the drawback of probing the packet traffic 405a after the de-compressor 404 is that some packet traffic must pass uncompressed or sub-optimally compressed through the compressor 403, until the header length estimator 402 makes its first prediction or determines the header length estimate for the first time.

Figure 4B:
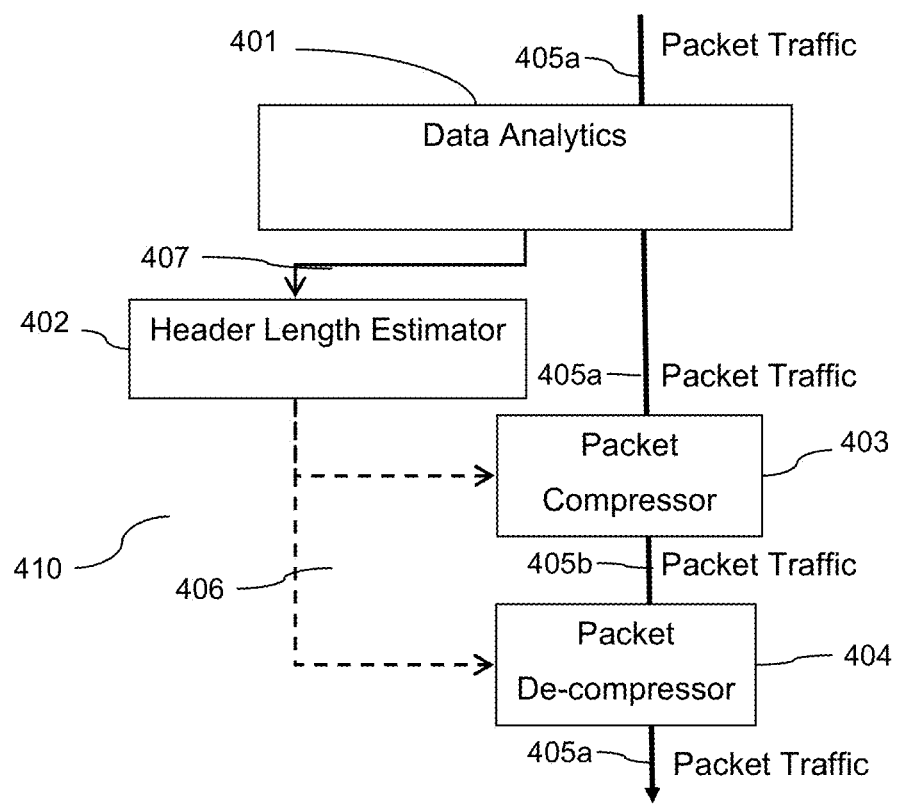
FIG. 4b is a schematic illustration of another example system for performing header length estimation.
Figure 4C:
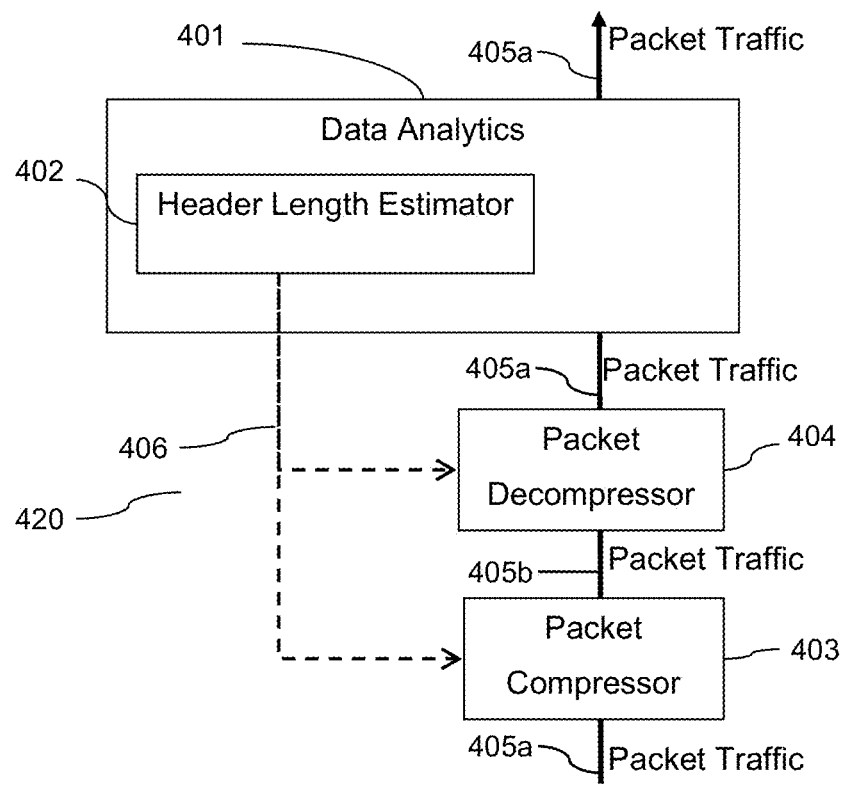
FIG. 4c is a schematic illustration of a further example system for performing header length estimation.

FIG. 4b is a schematic illustration of another example system 410 for use in analysing and determining an appropriate header length for use in packet header compression/decompression in a network. The network may include one or more network entities (not shown) and one or more UEs (not shown) that generate packet traffic 405a. The system 410 includes a data analytics apparatus 401 that performs data analytics on packet traffic 405a, the packet traffic 405a includes packet headers that are uncompressed. The data analytics apparatus 401 may perform packet inspection of the packet traffic 405a or receive packet information associated with the packet traffic and packet inspection from another network entity. The packet information may include data representative of the packet header information associated with an analysis of the packet traffic (e.g. statistics on the common packet headers, or information on the packet headers of the associated packet traffic, the types of communication protocols used or associated with packets in the packet traffic, etc.)

In this example, the data analytics apparatus 401 is coupled or in communication with a header length estimator 402. The data analytics apparatus 401 sends packet information (illustrated by the solid line 407) to the header length estimator 402 for use in determining an estimate of the header length of a relevant portion of the packet traffic 405a. The relevant portion of the packet traffic 405a includes the packets or packet traffic that is to be compressed by a packet compressor 403. The header length estimator 402 is in communication or is coupled to the packet compressor 403 and/or a packet decompressor 404. The packet compressor 403 may be located in a network entity (not shown) of the network responsible for packet compression, alternatively, the packet compressor may be located in a UE (not shown). The header length estimator 402 sends the header length estimate (illustrated by the dashed line 406) to the packet compressor 403 for use in compressing the packet headers of the relevant packet traffic 405a, to produce compressed packet traffic 405b. The header length estimator 402 may also send (illustrated by the dashed line 406) the header length estimate to the packet decompressor 404 for use decompressing the compressed packet headers of the corresponding compressed packets 405b, to produce the uncompressed packet traffic 405a. The packet compressor 403 and/or packet decompressor 404 are thus configured by the header length estimator 402 to use the header length estimate for compressing and decompressing the packet headers of the relevant packet traffic.

It is to be appreciated that the header length estimator 402 may be located in or part of another network entity or even located in or part of a UE. The data analytics apparatus 401 performs packet inspection or market analysis on the packet traffic being located in another part of the network (e.g. another dedicated data analytics network entity), the results of which are converted into packet information for use by header length estimator 402 in determining/estimating the header length. The header length estimator 402 may perform one or more of the operations as described with reference to FIGS. 2(a)-(c) to 4a.

FIG. 4c is another schematic illustration of an example system 420 in a network similar to system 400 for use in analysing and determining an appropriate header length for use in packet header compression/decompression in the network. The system 420 includes a data analytics apparatus 401 that performs data analytics on packet traffic 405a. The data analytics apparatus 401 may perform packet inspection or receive packet information associated with packet inspection from another network entity. The data analytics apparatus 401 provides a header length estimator 402 with packet information for use in determining an estimate of the header length of a relevant portion of packet traffic 405a. The packet information may include data representative of the packet header information associated with an analysis of the packet traffic (e.g. statistics on the common packet headers, or information on the packet headers of the associated packet traffic, the types of communication protocols used or associated with packets in the packet traffic, etc.)

The header length estimator 402 is in communication or is coupled to a packet decompressor 404 and/or packet compressor 403. Once estimated, the header length estimator 402 sends the header length estimate to the packet decompressor 403 for use in compressing the packet headers of the relevant packet traffic 405a. The header length estimator 402 may also send the header length estimate to a packet compressor 403 for use compressing the packet headers of the corresponding packet traffic 405a to produce compressed packet traffic 405b, which will subsequently be decompressed by packet decompressor 404. The packet decompressor 404 and/or packet compressor 403 are thus configured by the header length estimator 402 to use the header length estimate for decompressing and compressing the packet headers of the relevant packet traffic 405b and 405a, respectively. The header length estimator 402 may perform one or more of the operations as described with reference to FIGS. 2(a)-(c) to 4b.

Although the header length estimator 402 is illustrated as being part of data analytics apparatus 401, it is to be appreciated that the length estimator 402 may be located or part of another network entity or even in a UE, with the data analytics apparatus 401 performing packet inspection or market analysis on the packet traffic in another part of the network (e.g. another dedicated data analytics network entity). It is to be appreciated that the header length estimator 402, the compressor 403 and decompressor 404 may be located in the same part of the network or in the same network entity or UE, or they may be located in different parts of the network in different network entities or UEs. In the example of FIG. 4c, the header length estimator 402 is located after the decompressor 404 to allow the data analytics apparatus 401 or the header length estimator 402 to operate on uncompressed packet traffic 405a.

Figure 5A:
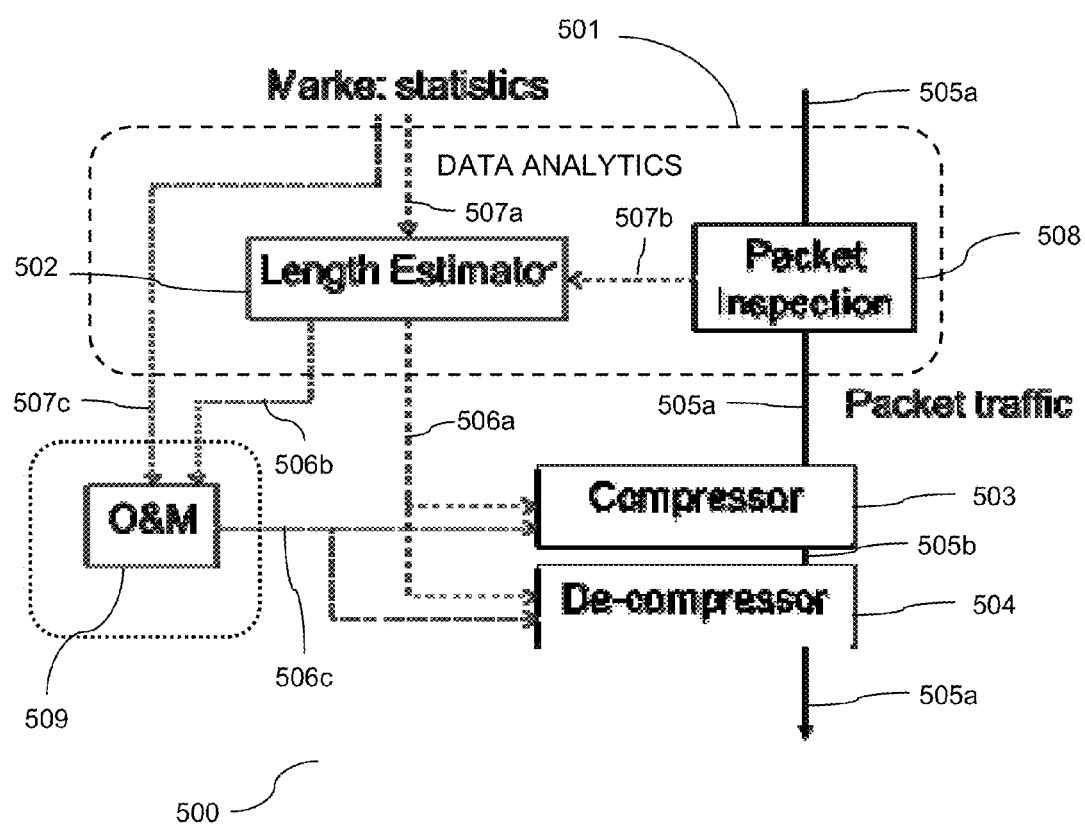
FIG. 5a is a schematic illustration of a further example system.

FIG. 5a is another schematic illustration of an example system 500 similar to systems 400 and 410 for use in analysing and determining an appropriate header length for use in packet header compression/decompression in a network. The system 500 includes a data analytics apparatus 501 that performs data analytics on packet traffic 505a, using packet inspection unit 508, which may be located in another part of the network. The data analytics apparatus 501 uses the information from PI unit 508 and/or may receive further packet information based on market statistics of packet traffic 505a or other packet traffic (not shown) as previously described. The data analytics apparatus 501 includes a header length estimator 502, which is provided with packet information (illustrated by dashed lines 507b and 507a) based on either the market statistics and/or the PI unit 508 for use in determining an estimate of the header length of a relevant portion of packet traffic 505a. The relevant portion of packet traffic 505a being the portion of packet traffic 505a that may be compressed by packet compressor 503 and subsequently decompressed by decompressor 504.

The header length estimator 502 is in communication or is coupled to the packet compressor 503 and/or packet decompressor 504, each of which may be located elsewhere in the network or co-located with the header length estimator 502. The packet compressor 503 may be located in the same network entity or UE as the header length estimator 502 or may be located in another network entity or UE in the network separate from the header length estimator 502 and/or data analytics apparatus 501. Similarly, the packet decompressor 504 may be located in the same network entity or UE as the header length estimator 502 or may be located in another network entity or UE in the network separate from the header length estimator 502 and/or data analytics apparatus 501.

The header length estimator 502 may perform one or more of the operations as previously described with reference to FIGS. 2(a)-(c) and 3-4c to estimate an appropriate header length for use in compressing/decompressing packets. Once estimated, the length estimator 502 sends the header length estimate (illustrated by the dashed line 506a) to the packet compressor 503 for use by the packet compressor 503 in compressing the packet headers of relevant packet traffic 505a into compressed packet traffic 505b. The header length estimator 502 may also send the header length estimate (illustrated by the dashed line 506a) to the packet decompressor 504 for use decompressing the packet headers of the corresponding packets. The packet compressor 503 and/or packet decompressor 504 are thus configured by the header length estimator 502 to use the header length estimate for compressing and decompressing the packet headers of relevant packet traffic 505a or subsequent relevant packet traffic 505a.

Additionally or alternatively, the header length estimate may optionally be sent to the packet compressor(s)/decompressor(s) 503/504 by out of band signalling, control signalling, other interfaces, or using compression header fields or compression header field extensions in the compressed packets that the compressor 503 may insert such that the corresponding decompressor 504 elsewhere in the network may retrieve the header length estimate for use in decompressing compressed packets that have been compressed using the estimated header length. Optionally, the estimated header length may be sent to the compressor 503 for compressing headers of subsequent packets, and the compressor 503 may further send the estimated header length that is used during compression of the packet header to the corresponding decompressor(s) 504 that will decompress the corresponding compressed packets.

By analysing user plane data packet traffic 505a before reaching the compressor 503, and/or market statistics (regional or terminal based), the header length estimator 502 estimates a header length for compression, or a header compression length, that is then reported to the compressor 503 and/or de-compressor 504. The header length estimate information can also reach (illustrated by the dashed lines 506b and 506c) the compressor 503 and/or de-compressor 504 via a network entity or element such as an operations and management (O&M) system 509.

That is the header length estimator 502 may be coupled to or in communication with the O&M system 509 such that the header length estimate may be sent (via dashed lines 506b) from the header length estimator 502 to the O&M system 509. For example, the network may have multiple header length estimators 502 in the network and the O&M system 509 may receive header length estimates from these various header length estimators 502. The O&M system 509 then sends the appropriate header length estimate (illustrated by dashed lines 506c) at predetermined time intervals, or when various events occur that affect one or more of header length estimates, or when the corresponding header length estimate is updated by the corresponding header length estimator 502, to each corresponding compressor 503 and/or decompressor 504 in the network. Thus the compressor/decompressor 503/504 may be configured by the O&M system 509 with the header length estimate.

Additionally or alternatively, the O&M system 509 may include the functionality of a header length estimator 502, and as such the O&M system 509 may receive packet information associated with statistics collected at a regional (or market) level, or for different UE/mobile terminal types or manufactures, or chipset vendors, to find how often certain transport protocols or certain IP or TCP options are typically used, or other regional/terminal related differences. The O&M system 509 may then provide an estimated header length estimate that is calculated to configure the header length to compress per market, as an average fitting typical packet traffic in that region/market (e.g. based on PLMN-ID), or for a certain UE type (e.g. based on IMEI).

Although the header length estimator 502 is illustrated as being part of data analytics apparatus 501, it is to be appreciated that the length estimator 502 may be located or part of another network entity or even in a UE, with the data analytics apparatus 501 performing packet inspection or market analysis on the packet traffic in another part of the network (e.g. another dedicated data analytics network entity). Similarly, PI unit 508 may also be located elsewhere in the network. It is to be appreciated that the header length estimator 502, the compressor 503 and decompressor 504 may be located in the same part of the network or in the same network entity or UE, or they may be located in different parts of the network in different network entities or UEs. In the example of FIG. 5a, the header length estimator 502 is located in the network upstream of the compressor 503 in the network or before the compressor 503 to allow the data analytics apparatus 501 or the header length estimator 502 to operate on uncompressed packet traffic 505a.

Figure 5B:
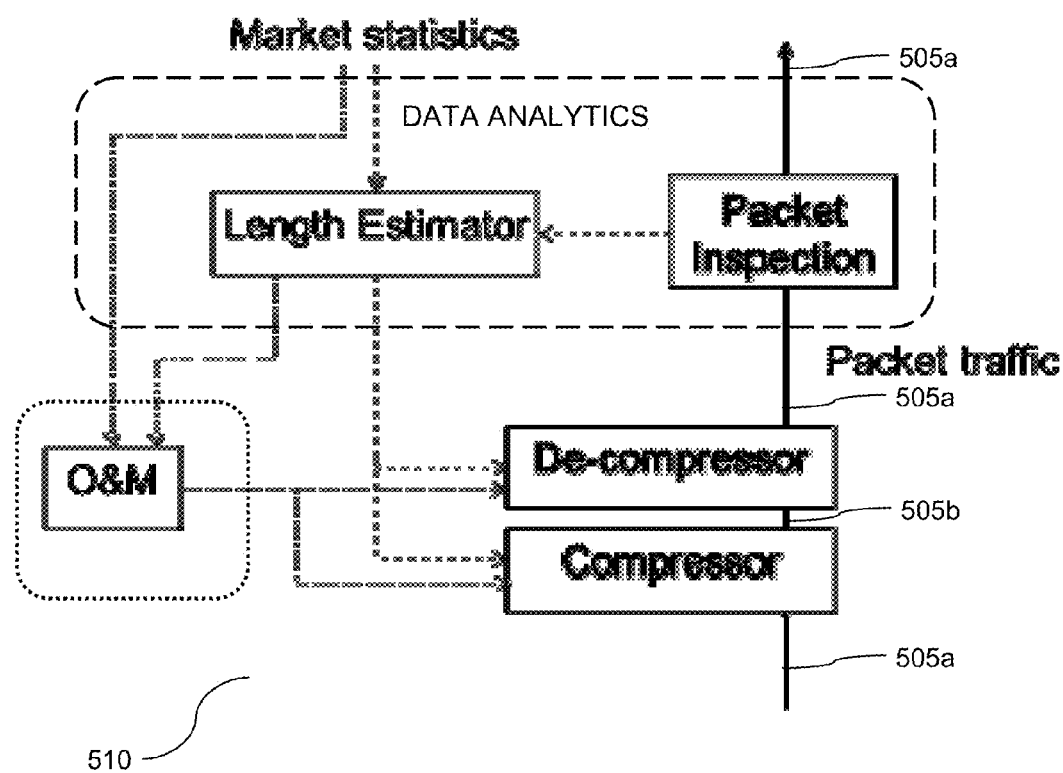
FIG. 5b is a schematic illustration of yet another example system.

FIG. 5b is another schematic illustration of an example system 510 similar to system 500 for use in analysing and determining an appropriate header length for use in packet header compression/decompression in a network. This example differs from the system 500 by instead by analysing and taking into account user plane data packet traffic 505a and/or market statistics (regional or terminal based) after the decompressor 504 or downstream of the decompressor 504 in the network so that the header length estimator 502 can estimate the header length for use in compressing packet headers, which is then reported to the decompressor 504 and/or compressor 503. The header length estimate information can also reach the compressor 503 and decompressor 504 through an O&M system 509.

Figure 6:
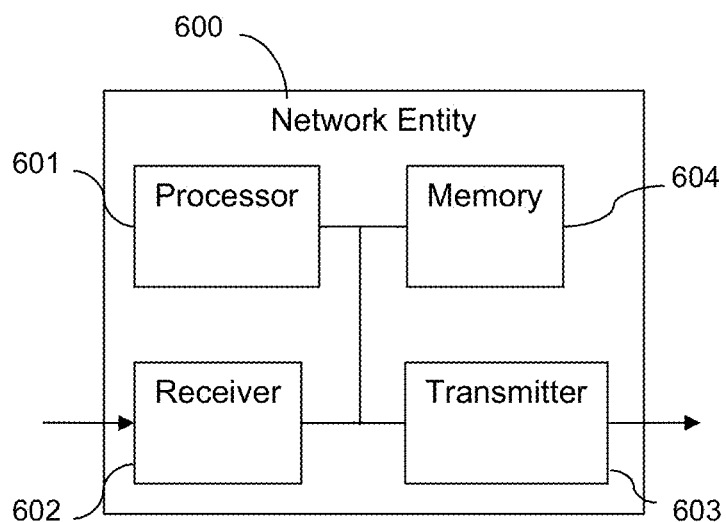
FIG. 6 is a schematic illustration of a network entity for use with the method(s) and apparatus.

FIG. 6 is a schematic illustration of an example network entity 600 according to the invention. The network entity 600 may be for use in a communications network, the communications network including a RAN and a wireless network. The network entity 600 comprising a processor 601, a receiver 602, a transmitter 603 and a memory 604, the processor 601 being coupled to the receiver 602, the transmitter 603 and the memory 604. The receiver 602 is configured for communicating with the wireless network and/or UEs in the network. The transmitter 603 configured for communicating with the wireless network. In addition or alternatively, the receiver 602 and transmitter 603 may be in the form of one or more transceivers capable of communicating with the radio access network or network entities within the network. In operation the network entity 600 may be configured to perform the methods and functions of the systems and/or apparatus for analysing and/or determining or estimating packet header lengths according to the invention as described above and/or described with reference to FIGS. 2(a),(b),(c) and 3-5b.

For example, in operation, the processor 601 and receiver 602 may be configured to receive packet information associated with packet traffic. The packet information including data representative of packet header information based on an analysis performed on packet traffic. The analysis may have been performed by the network entity 600, or by another data analytics network entity elsewhere in the network, which may involve varying levels/complexity of packet inspection. The processor 601 is configured to determine an estimate of the header length of relevant packet traffic based on the received packet information. The relevant packet traffic is associated with the packets the network entity 600 will be receiving or the packets the network entity 600 may be transmitting/forwarding on in the network, which are to be decompressed at another network entity or a UE etc. or compressed by the network entity 600. The memory 604 may include a compression/decompression algorithms that cause the processor 601 to perform compression/decompression on the appropriate packets. The memory 604 may further include applications or programs for performing the functions of the header length estimator as described, and/or analysis of packet traffic relevant to the network entity 600.

The header length estimate is used for compressing the packet headers of one or more packets by a packet compressor (not shown) or compression algorithm prior to transmission by the network entity 600 onwards in the network to the destination. The transmitter 603 is configured to transmit the compressed packets. The header length estimate is sent to the packet compressor or compression algorithm for compressing the packet headers of the packets to be transmitted. The transmitter 603 is further configured to transmit the header length estimate to one or more decompressors in the network (e.g. in other network entities or even other UEs) for use in decompressing the compressed packet headers of the corresponding packets that have been compressed using the header length estimate.

Additionally, the processor 601 may be configured to analyse further relevant packet traffic or receive further packet information associated with further relevant packet traffic for use in determining whether the header length estimate is to be updated. This may involve the processor 601 determining a further header length estimate and comparing the further header length estimate with the current header length estimate used in compressing the packets. If the further header length estimate is significantly different to the current header length estimate, then the processor 601 may replace the current header length estimate with the further header length estimate, or the processor 601 may be configured to perform another analysis or receive further packet information for determining a new header length estimate for reconfiguring the compressor and/or the one or more decompressors. The transmitter 603 may be configured to transmit the new header length estimate to the corresponding packet decompressor(s) for decompressing the corresponding transmitted compressed packet traffic.

In addition or alternatively, the network entity 600 may be configured to receive a header length estimate from another network entity or a UE associated with packets compressed by the other network entity or UE. The network entity 600 stores the header length estimate and configured the processor 601 to use the header length estimate for decompressing compressed packets associated with the other network entity or UE.

Figure 7:
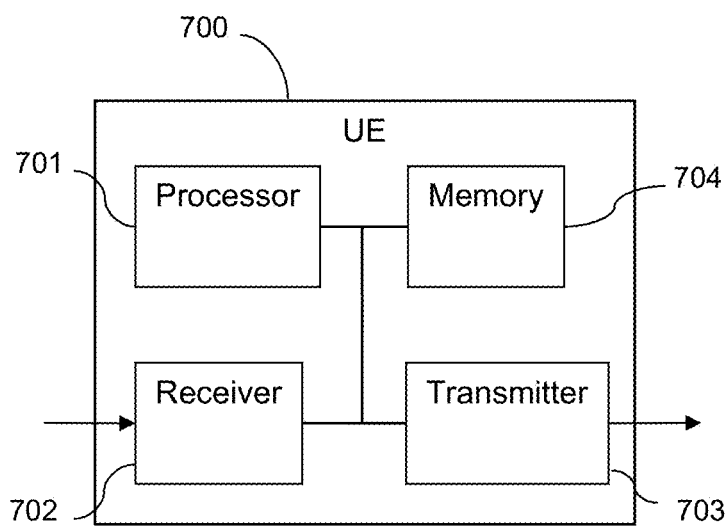
FIG. 7 is a schematic illustration of a user equipment for use with the method(s) and apparatus.

FIG. 7 is a schematic illustration of an example user equipment 700 according to the invention. The user equipment 700 may be for use in a communications network, the communications network including a RAN and a wireless network. The UE 700 comprising a processor 701, a receiver 702, a transmitter 703 and a memory 704, the processor 701 being coupled to the receiver 702, the transmitter 703 and the memory 704. The receiver 702 is configured for communicating with network entities in the wireless network and/or other UEs in the network. The transmitter 703 configured for communicating with the wireless network and/or other UEs in the network. In addition or alternatively, the receiver 702 and transmitter 703 may be in the form of one or more transceivers capable of communicating with a radio access network and/or network entities of the network and/or other UEs. In operation the UE 700 may be configured to perform the methods and functions of the systems and/or apparatus for analysing and/or estimating packet header lengths according to the invention as described above and/or described with reference to FIGS. 2(*a*),(*b*),(*c*) and 3-6.

For example, in operation, the processor 701 and receiver 702 may be configured to receive packet information associated with packet traffic. The packet information including data representative of packet header information based on an analysis performed on packet traffic. The analysis may have been performed by the UE 700, or by another data analytics network entity, which may involve varying levels of packet inspection. The processor 701 is configured to determine an estimate of the header length of relevant packet traffic based on the received packet information. The relevant packet traffic is associated with the packets the UE 700 will be receiving or the packets the UE 700 may be transmitting, which are to be decompressed at the UE 700 or compressed by the UE 700. The memory 704 may include a compression/decompression algorithm that causes the processor 701 to perform compression/decompression on the appropriate packets. The memory 704 may further include applications or programs for performing the functions of the header length estimator as described, and/or analysis of packet traffic relevant to the UE 700.

The header length estimate is used for compressing the packet headers of one or more packets by a packet compressor (not shown) or compression algorithm prior to transmission by the UE 700. The transmitter 703 is configured to transmit the compressed packets. The header length estimate is sent to the packet compressor or compression algorithm for compressing the packet headers of the packets to be transmitted. The transmitter 703 is further configured to transmit the header length estimate to one or more decompressors in the network for use in decompressing the compressed packet headers of the corresponding packets that have been compressed using the header length estimate.

In addition, the processor 701 may be configured to analyse further relevant packet traffic or receive further packet information associated with further relevant packet traffic for use in determining whether the header length estimate is to be updated. This may involve the processor 701 determining a further header length estimate and comparing the further header length estimate with the current header length estimate used in compressing the packets. If the further header length estimate is significantly different to the current header length estimate, then the processor 701 may replace the current header length estimate with the further header length estimate, or the processor 701 may be configured to perform another analysis or receive further packet information for determining a new header length estimate for reconfiguring the compressor and/or the one or more decompressors. The transmitter 703 may be configured to transmit the new header length estimate to the corresponding packet decompressor(s) for decompressing the corresponding transmitted compressed packet traffic.

In addition or alternatively, the UE 700 and receiver 702 may be configured to receive a header length estimate from another network entity or a UE associated with packets compressed by the other network entity or UE. The UE 700 stores the header length estimate and configures the processor 601 to use the header length estimate for decompressing compressed packets associated with the other network entity or UE.

It is to be appreciated that the methods, apparatus, network entities, and UEs may be associated with a variety of packet networks, which may include, but are not limited to previous PS network generations (2G, 2.5G, and 3G) such as UMTS, Wideband Code Division Multiple Access networks, Third Generation Partnership (3GPP) networks, Wi-Fi networks, enhanced PS networks based on LTE or LTE-Advanced systems, all IP networks, networks based on the EPS, which include an EPC that forms the basis of the core PS network for the all IP network, and future PS network generations such as 4G and beyond or combinations thereof.

The systems, apparatus, network entities, and/or UEs as described herein each may perform or contribute to one or more of the analysis of packet traffic for packet information, receive packet information associated with the packet traffic, determination and estimation of the packet header length(s) based on the packet information for relevant portion(s) of packet traffic for use in compressing/decompressing subsequent relevant packet being communicated in a network. The processors of such systems, apparatus, network entities, and UEs may be configured to execute computer program instructions based on the methods and processes described herein, such instructions being contained in a non-transitory computer-readable medium, such as memory. The computer program instructions may be read into memory from another computer-readable medium or from another device via a communication interface. The instructions contained in memory cause the processor of a system, apparatus, network entities, and/or UEs or other such computer system to perform processes or methods as described herein. Alternatively or in addition to, hardwired circuitry may be used in place of or in combination with the computer program instructions to implement processes and methods consistent with the present invention. Examples of hardware circuitry may include, but are not limited to, semiconductor chips, integrated circuits, field programmable gate arrays, application-specific integrated circuits, electronically programmable integrated circuits and the like. Thus, the present invention is not limited to any specific combination of hardware circuitry and/or software.

The non-transitory computer readable medium may include computer program instructions stored thereon, which when executed on one or more processors of a server, server system, or other computing system, performs the processes or method steps of one or more of the functions of analysing packet traffic for packet information, receiving packet information associated with the packet traffic, determining and estimating the packet header length(s) based on the packet information for relevant portion(s) of packet traffic for use in compressing/decompressing subsequent relevant packets being communicated in a network as described herein with reference to FIGS. 1a-7.

Although the invention has been described in terms of preferred embodiments as set forth above, it should be understood that these embodiments are illustrative only and are not limited only to those embodiments. Those skilled in the art will be able to make modifications and alternatives in view of the disclosure which are contemplated as falling within the scope of the invention as described. Each feature disclosed or illustrated in the present specification may be incorporated in the invention, whether alone or in any appropriate combination with any other feature disclosed or illustrated herein.

What is claimed is:

1. A method of configuring a header compression or decompression algorithm in a packet network comprising:
   analysing or receiving packet information associated with packet traffic;
   determining a representative header length to consider as a header length for a plurality of packets, wherein the determining the representative header length is performed at predetermined time intervals, and wherein the determining the representative header length comprises estimating the representative header length using traffic data obtained from analysis of past traffic; and
   using the representative header length to configure one or more compression or decompression algorithms used in the packet network.

2. The method as claimed in claim 1, wherein the determining the representative header length comprises determining a most efficient header length for the plurality of packets.

3. The method as claimed in claim 1, wherein the header length comprises one or more protocol headers.

4. The method as claimed in claim 1, wherein the plurality of packets comprises subsequent packets to be transmitted.

5. The method of claim 4, wherein the subsequent packets comprise packets associated with one of: a communications connection or session, a user equipment, a type of user equipment, an IP address, a port number, a network, and a region.

6. The method as claimed in claim 1, wherein the plurality of packets comprises an entire bit stream.

7. The method as claimed in claim 1, wherein the using the representative header length to configure one or more compression or decompression units or algorithms used in the packet network comprises using the determined header length to pre-configure one or more compression or decompression units or algorithms.

8. The method as claimed in claim 1, further comprising compressing or decompressing a section of each of the plurality of packets, wherein a length of the section is determined by the representative header length.

9. The method of claim 1, wherein the determining the representative header length comprises packet inspection of at least one packet.

10. The method of claim 9, wherein the packet inspection comprises one or more of IP header classification, shallow packet inspection, deep packet inspection, and heuristic detection.

11. The method as claimed in claim 1, wherein the determining the representative header length comprises estimating the representative header length based on receiving the packet information associated with the packet traffic in the packet network.

12. The method as claimed in claim 1, wherein the analysis of past traffic comprises determining or estimating usage of protocol options.

13. The method as claimed in claim 1, wherein the determining the representative header length is triggered by a network event.

14. The method as claimed in claim 13, wherein the network event is one of: a beginning or an end of a communication session and a detection that a present representative length is unsuitable or sub-optimal for the plurality of packets.

15. The method of claim 1, wherein the representative header length is used for a downlink packet and the representative header length is also used for configuring the compression algorithm for compression of an uplink packet or vice versa.

16. Apparatus for compression or decompression of packet headers in a communications network, the apparatus comprising:
    a processor and a non-transitory computer-readable storage medium coupled to the processor, the non-transitory computer-readable storage medium comprising:
        a length estimator configured to provide a representative header length of the packet headers, wherein the length estimator is configured to provide the representative header length at predetermined time intervals and wherein the length estimator is further configured to provide the representative header length in response to a network event, wherein the network event is one of: a beginning of a communication session, an end of a communication session, and a detection that a present determined length is unsuitable or sub-optimal for a plurality of packets; and
        a compression or decompression module configured using the representative header length.

17. The apparatus as claimed in claim 16, further comprising a data analytics unit configured to perform data analytics on packet traffic.

18. The apparatus as claimed in claim 17, wherein the data analytics unit is configured to receive packet information associated with the packet traffic and packet inspection from another network entity.

19. The apparatus as claimed in claim 17, wherein the data analytics unit is configured to perform packet inspection of the packet traffic.

20. The apparatus as claimed in claim 17, wherein the data analytics unit is configured to perform one of more of: IP header classification, shallow packet inspection, deep packet inspection, and heuristic detection.

21. The apparatus as claimed in claim 16, wherein the representative header length is an estimated header length.

22. The apparatus as claimed in claim 16, wherein the length estimator is configured to estimate the provided representative header length using data on received packet information associated with packet traffic in the network.

23. A system comprising:
at least one apparatus for compression or decompression of packet headers in a communications network, the apparatus including:
- a processor and a non-transitory computer-readable storage medium coupled to the processor, the non-transitory computer-readable storage medium comprising:
  - a length estimator configured to provide a representative header length of the packet headers, wherein the length estimator is configured to provide the representative header length at predetermined time intervals and wherein the length estimator is further configured to provide the representative header length in response to a network event, wherein the network event is one of: a beginning of a communication session, an end of a communication session, and a detection that a present determined length is unsuitable or sub-optimal for a plurality of packets; and
  - a compression or decompression module configured using the representative header length;
at least one operations and management network element; and
at least one additional compressor or decompressor, the operations and management network element being configured to receive the representative header length from the apparatus and to transmit at intervals appropriate header estimates to each of the at least one additional compressor or decompressor.

* * * * *